United States Patent [19]

Mukai et al.

[11] Patent Number: 4,926,201

[45] Date of Patent: May 15, 1990

[54] FINDER OPTICAL SYSTEM

[75] Inventors: Hiromu Mukai; Ichiro Kasai, both of Osaka, Japan

[73] Assignee: Minolta Camera Kabushiki Kaisha, Osaka, Japan

[21] Appl. No.: 361,233

[22] Filed: Jun. 5, 1989

[30] Foreign Application Priority Data

Jun. 7, 1988 [JP] Japan .................. 63-140759

[51] Int. Cl.[5] ........................... G03B 13/02
[52] U.S. Cl. .................. 354/219; 350/432
[58] Field of Search ............... 354/219–225, 354/155, 166, 199; 352/171; 350/410, 432, 435

[56] References Cited

U.S. PATENT DOCUMENTS

| | | | |
|---|---|---|---|
| 4,437,750 | 3/1984 | Ikari | 354/155 |
| 4,593,984 | 6/1986 | Kimura et al. | 354/219 |
| 4,707,103 | 11/1987 | Ikemori et al. | 354/225 X |
| 4,765,725 | 8/1988 | Suda | 350/432 |

FOREIGN PATENT DOCUMENTS 61-156018  7/1986  Japan .
61-156019  7/1986  Japan .

*Primary Examiner*—L. T. Hix
*Assistant Examiner*—Brian W. Brown
*Attorney, Agent, or Firm*—Price, Gess & Ubell

[57] ABSTRACT

A finder optical system comprises from the object side an objective lens having a positive refractive power as a whole, a condenser lens arranged in the vicinity of an image plane of the objective lens, an eyepiece consisting of a single lens element and having a positive refractive power, and further comprises a prism installed between the condenser lens and the eyepiece to introduce light fluxes having been passed through the condenser lens into the eyepiece, and wherein the finder optical system fulfills the following conditions; $\nu < 50$, $15 \text{ mm} < fe < 50 \text{ mm}$, $0.7 < L/fe < 1$, wherein, $\nu$ represents an Abbe number of the prism, $fe$ represents a focal length of the eyepiece, and L represents an optical path length of the prism defined as a ratio of thickness of the prism to the refractive index thereof. Thereby, axial chromatic aberration can be corrected well, and additionally, a finder image with high mangification is obtainable. Furthermore, compactness and cost reduction can be attained owing to the simple constitution.

11 Claims, 7 Drawing Sheets

FINDER OPTICAL SYSTEM

BACKGROUND OF THE INVENTION

1. Field of the Invention

The present invention relates to a finder optical system in a camera, and more particularly to a finder optical system in which an eyepiece is constituted with a single lens element.

2. Description of the Prior Art

In general, finder magnification of a finder optical system is defined as fo/fe, wherein fo represents a focal length of an objective lens and fe represents a focal length of an eyepiece. Accordingly, in order to increase the finder magnification, the focal length of of the objective lens has to be made larger or the focal length fe of the eyepiece has to be made smaller. In a lens shutter camera, the objective lens in the finder optical system and a photo-taking lens are separated from each other, and therefore if the focal length fo of the objective lens is lengthened, the total length of the finder optical system is also lengthened, which makes it difficult to attain the compactness of the whole finder optical system. Thus, the finder magnification of the lens shutter camera is generally small compared with that of a single lens reflex camera, and therefore an image in the finder becomes difficult to be seen clearly. For this reason, in various conventional lens shutter cameras, the finder magnification is intended to be made as large as possible by shortening the focal length fe of the eyepiece.

Further, it is usual that the eyepiece of the lens shutter camera consists of the combination of a negative lens element and a positive lens element, whereby achromatization is performed so as to correct chromatic aberration.

In view of the space, position accuracy, surface accuracy and cost, it is more advantageous to constitute the eyepiece with a single lens element. However, since achromatization is not performed, axial chromatic aberration becomes difficult to be corrected effectively by such simple constitution of the eyepiece. Particularly, as the focal length fe of the eyepiece is made smaller, the axial chromatic aberration turns for worse extremely.

SUMMARY OF THE INVENTION

It is an object of the present invention to provide a finder optical system of a real image type employed in a lens shutter camera and the like wherein an eyepiece is constituted with a single lens element and a focal length of the eyepiece is made shorter to attain the compactness of the whole finder optical system and high finder magnification, and further chromatic aberration can be corrected to such a degree that the eyepiece can be put in practical use in spite of its simple constitution with the single lens element.

Another object of the present invention is to provide a finder optical system as constituted as described above wherein not only the chromatic aberration but also the other aberrations can be corrected well.

In accordance with one feature of the present invention, the finder optical system comprises from the object side:

an objective lens having a positive refractive power as a whole;

a condenser lens arranged in the vicinity of an image plane of said objective lens;

an eyepiece consisting of a single lens element and having a positive refractive power;

and further comprising:

a prism installed between said condenser lens and said eyepiece to introduce light fluxes having been passed through said condenser lens into said eyepiece;

and wherein the finder optical system fulfills the following conditions:

$$\nu < 50$$

$$15\text{mm} < fe < 50\text{mm}$$

$$0.7 < L/fe < 1$$

wherein, $\nu$ represents an Abbe number of the prism;

fe represents a focal length of the eyepiece; and

L represents an optical path length of the prism defined as a ratio of thickness of the prism to the refractive index thereof.

In accordance with another feature of the present invention, the finder optical system comprises from the object side:

an objective lens having a positive refractive power as a whole;

a condenser lens arranged in the vicinity of an image plane of said objective lens;

an eyepiece consisting of a single lens element and having a positive refractive power;

and further comprising:

a prism installed between said condenser lens and said eyepiece in introduce light fluxes having been passed through said condenser lens into said eyepiece;

and wherein the finder optical system fulfills the following conditions:

$$\nu < 50$$

$$15\text{mm} < fe < 50\text{mm}$$

$$l \leq 2.5\text{mm}$$

wherein, $\nu$ represents an Abbe number of the prism;

fe represents a focal length of the eyepiece; and l represents a distance between an exit pupil side surface of the prism and an object side principal point of the eyepiece.

According to the above-described features of the present invention, it becomes possible to correct the axial chromatic aberration and the other various aberrations well even if the eyepiece is composed of the single lens element. In addition thereto, by adopting the simple constitution of the eyepiece with the single lens element, the space thereof occupied in the finder optical system becomes smaller, and therefore the eyepiece suitable for a compact lens shutter camera can be realized. Furthermore, the simple constitution facilitates manufacturing of the eyepiece and produces extremely good results in cost reduction. Additionally, the image in the finder with high magnification is obtainable because of the small focal length of the eyepiece.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

DETAILED DESCRIPTION OF THE PREFERRED EMBODIMENTS

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured finder optical system. The derivation of the formulas and the relation of the powers set forth herein can be accomplished with the assistance of a computer. The present invention represents the parameters of a compromise balance of acceptable aberrations which can be relatively easily manufactured to provide a low cost finder optical system for utilization with a lens shutter camera and the like.

Figure 1:
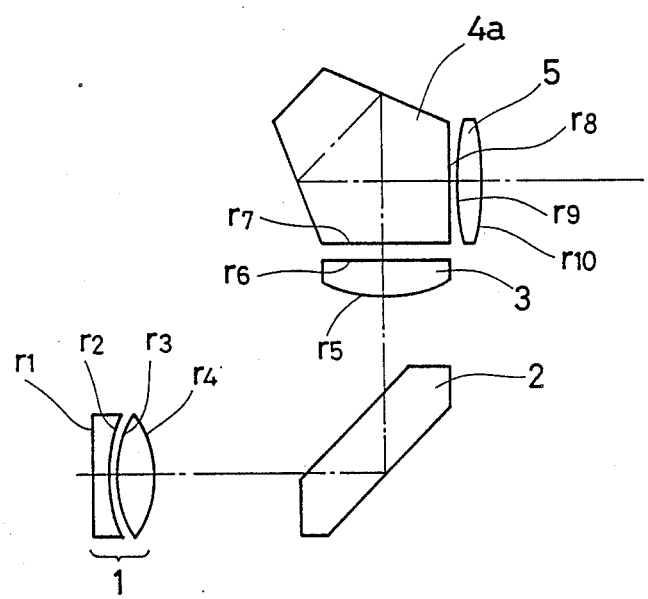
FIG. 1 is a transverse sectional view showing one embodiment in accordance with the present invention.

As shown in FIG. 1, the present invention provides a finder optical system comprising from the object side:

an objective lens 1 having a positive refractive power as a whole;

a condenser lens 3 arranged in the vicinity of an image plane of said objective lens;

an eyepiece 5 consisting of a single lens element and having a positive refractive power; and further comprising:

a prism 4 installed between said condenser lens 3 and said eyepiece 5 to introduce light fluxes having been passed through said condenser lens 3 into said eyepiece 5;

and wherein the finder optical system fulfills the following conditions:

$\nu < 50$      ①

$15\text{mm} < fe < 50\text{mm}$      ②

$0.7 < L/fe < 1$      ③ wherein, $\nu$ represents an Abbe number of the prism 4;

fe represents a focal length of the eyepiece 5; and

L represents an optical path length of the prism 4 defined as a ratio of thickness of the prism 4 to the refractive index thereof.

However, the above-mentioned respective conditions will be described.

Figure 3:
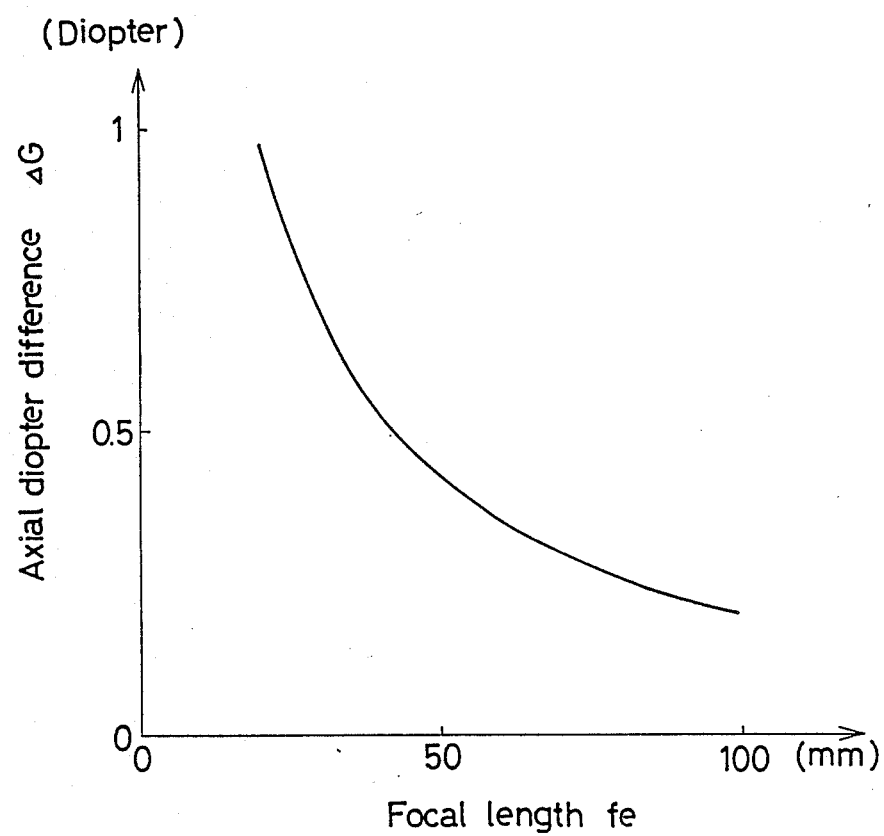
FIG. 3 is a view showing the relation between a focal length of an eyepiece and diopter difference between G-line and D-line relating to axial chromatic aberration.
Figure 4:
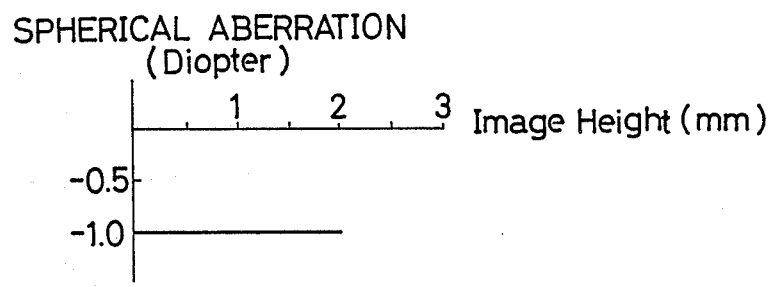
FIGS. 4(a) and 4(c) represent the aberration curves of a first embodiment.
Figure 4:
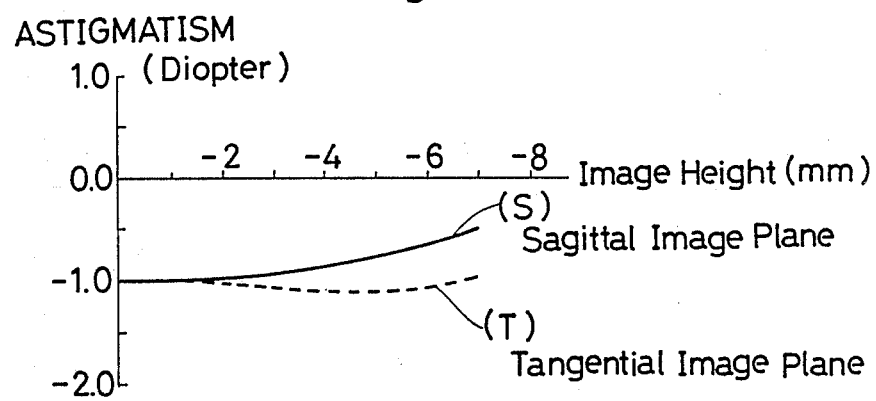
Figure 4:
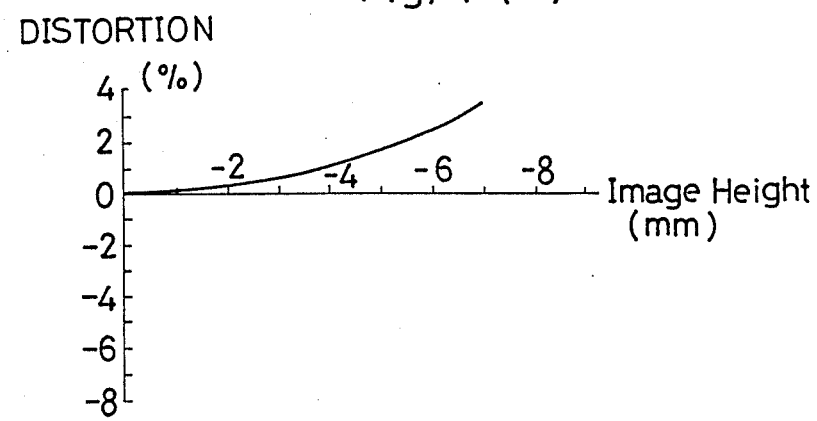
Figure 5:
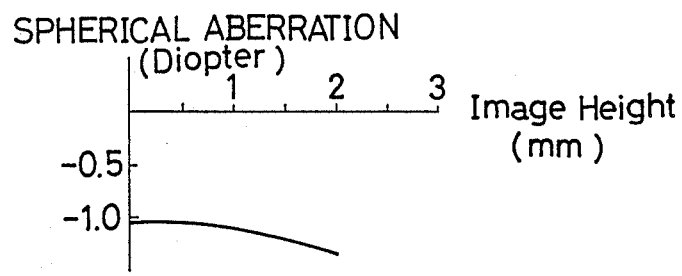
FIGS. 5(a) to 5(c) represent the aberration curves of a second embodiment.
Figure 5:
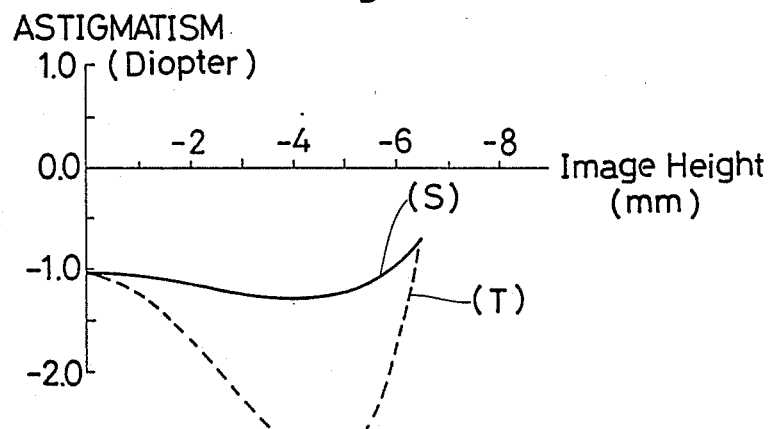
Figure 5:
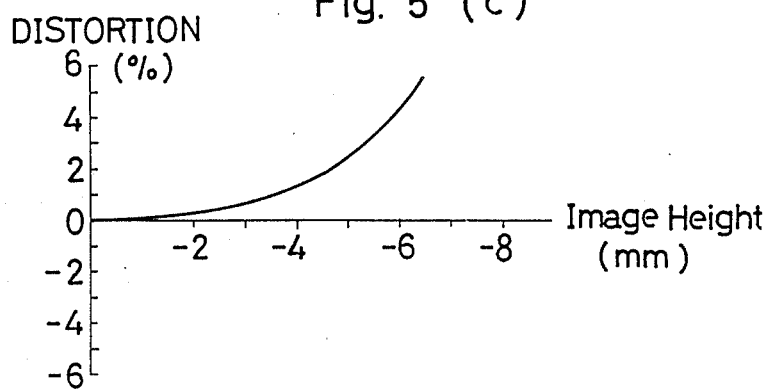
Figure 6:
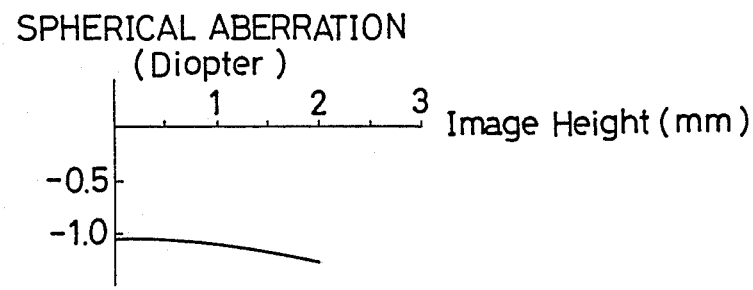
FIGS. 6(a) to 6(c) represent the aberration curves of a third embodiment.
Figure 6:
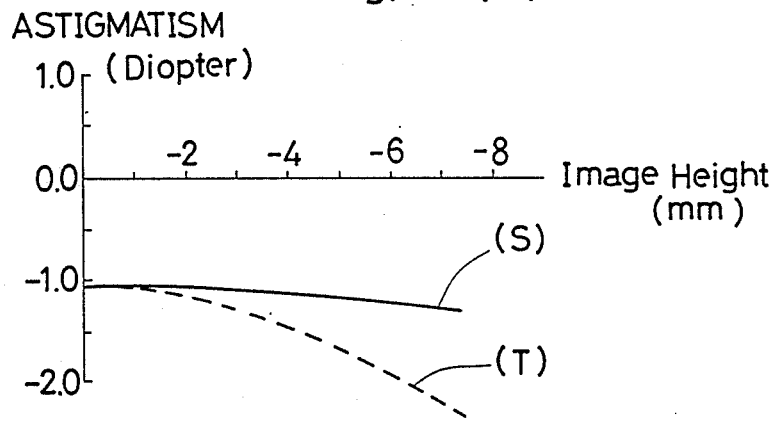
Figure 6:
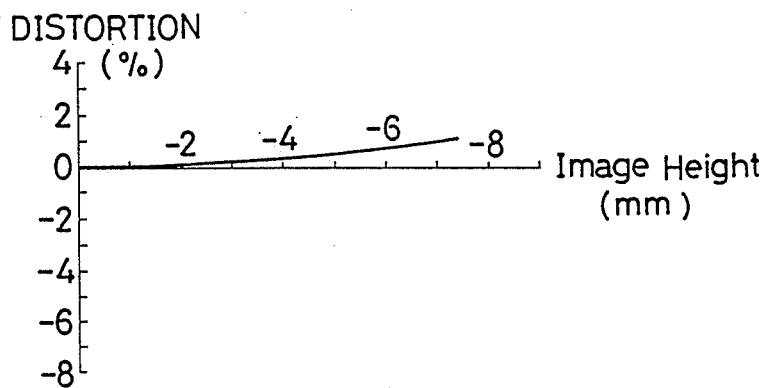
Figure 7:
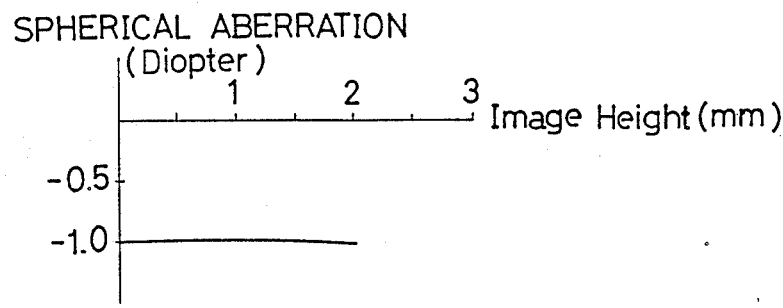
FIGS. 7(a) to 7(c) represent the aberration curves of a fourth embodiment.
Figure 7:
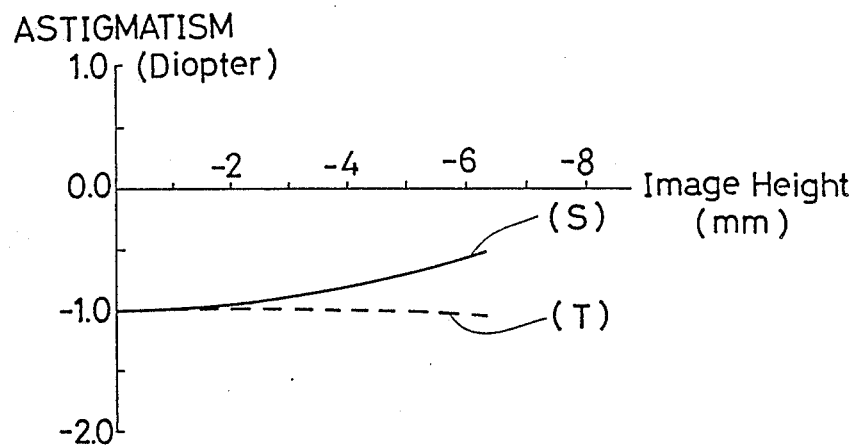
Figure 7:
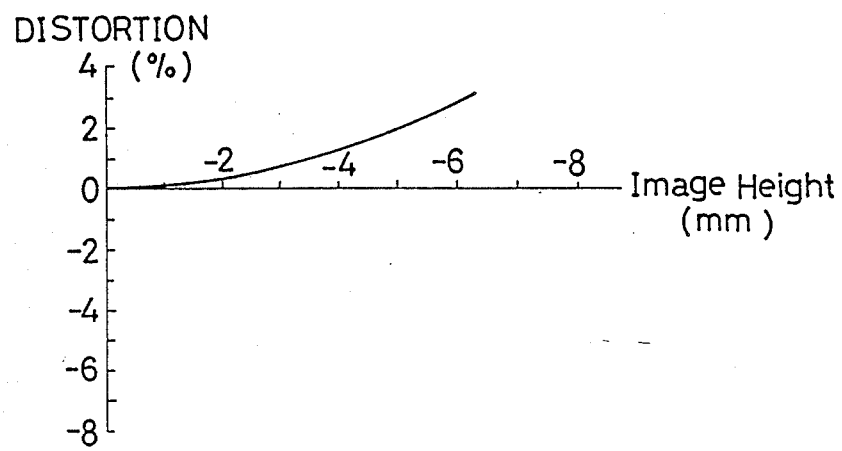

FIG. 3 is a view showing the relation between diopter difference of G-line and D-line and a focal length of an eyepiece in the case where the eyepiece is constituted with a single lens element, wherein the vertical axis represents a difference ΔG between the diopter relating to the G-line and the diopter relating to the D-line, which corresponds to the chromatic aberration between G-line and D-line, and the horizontal axis represents the focal length fe [mm] of the eyepiece. When the diopter difference ΔG is not more than 0.5 diopter, an image in the finder is hardly affected by the chromatic aberration, while in the case of exceeding 0.5 diopter, the undesirable influence due to the chromatic aberration comes to appear on the image. Accordingly, as is understood from FIG. 3, it is difficult to constitute the eyepiece with a single lens element whose focal length fe is not more than 50 mm. As for the eyepiece of the finder optical system employed in a single lens reflex camera, the focal length thereof is 60 through 80 mm, which makes it possible to constitute the eyepiece with a single lens as it is. On the other hand, in the case of a lens shutter camera, in order to increase finder magnification defined as of/fe, wherein of represents a focal length of the objective lens, and also to reduce the space occupied by the finder optical system, the focal length fe of the eyepiece is desirable to be made as short as possible. However, in the range of fe<15, the radius of curvature of the eyepiece is made smaller exceedingly, and therefore if the eyepiece consists of only a single lens element, the other aberrations besides the chromatic aberration are deteriorated exceedingly.

According to the present invention, though the eyepiece consists of a single lens element having the focal length within the range of 15<fe<50 as shown by Condition ②, the chromatic aberration is corrected more satisfactorily. For the purpose of correcting the axial chromatic aberration well, the prism disposed between the condenser lens and the eyepiece has the Abbe number in the range of $\nu < 50$ as shown in Condition ①. This means that the prism having high dispersion (a small Abbe number) plays a role of achromatization relative to the axial chromatic aberration generated at the eyepiece of the single lens element having the short focal length fe. To put it concretely, as the focal length of the eyepiece consisting of the single lens element is made shorter, the diopter with respect to the G-line shifts larger in the positive direction, so that, as shown in FIG. 3, the axial diopter difference ΔG becomes larger. However, a refractive index of the prism with respect to the G-line becomes large owing to the high dispersion of the prism arranged in front of the eyepiece, thus the diopter with respect to the G-line can be corrected in the negative direction.

In the case of the single lens reflex camera, though BK$_7$ ($\nu$=64) with low dispersion is generally adopted for a pentagonal roof prism arranged before the eyepiece, as aforementioned, the focal length of the eyepiece is as long as 60 through 80 mm, causing no problem in this connection.

Besides the above-mentioned Conditions ① and ②, if the thickness L' of the prism is within the predetermined range, the prism can carry out its function more effectively. The thickness L' of the prism is equal to a length of the prism measured along an optical axis of the eyepiece optical system.

Condition ③ defines the optical path length L in relation to the focal length fe of the eyepiece, on condition that the optical path length L of the prism is represented as $L = L'/n_P$ where $n_P$ represents the refractive index of the prism relative to D-line. If the lower limit of Condition ③ is exceeded, it becomes difficult to obtain the desired results sufficiently in spite of the high dispersion of the prism, and satisfactory correction of the chromatic aberration is therefore made difficult to be performed. Conversely, if the upper limit of Condition ③ is violated, the eyepiece has to be shaped as a meniscus lens, and therefore both spherical aberration and astigmatism turn for worse.

In order to obtain the finder optical system in which finder magnification is sufficiently high and the chromatic aberration is corrected well, in addition to the above-mentioned Conditions ① and ②, it is desirable that a distance l between an exit pupil side surface of the prism and an object side principal point of the eyepiece fulfills the following condition:

$$l \leq 2.5 mm \qquad ④$$

Unless Condition ④ is fulfilled, the focal length fe of the eyepiece is difficult to be shortened, which not only causes reduction in the finder magnification but also results in the contrary to the compactness of the whole finder optical system because of divergency of light fluxes incident on the eyepiece.

For the similar reasons to the above-described, the refractive index $n_P$ of the prism relative to D-line is desirable to fulfill the following condition:

$$n_P > 1.7$$

Furthermore, besides the above-mentioned conditions, either surface of the eyepiece is desirably formed into an aspherical surface shaped such that the radius of curvature becomes gradually longer away from the optical axis. By adopting the aspherical surface for one side of the eyepiece, the spherical aberration and the astigmatism are both corrected well.

The shape of the eyepiece having the above-described aspherical surface fulfills the following expression:

$$T(h) > r_B\left(1 - \sqrt{1 - \left(\frac{h}{r_B}\right)^2}\right) -$$

$$r_F\left(1 - \sqrt{1 - \left(\frac{h}{r_F}\right)^2}\right) + D$$

wherein, h represents a height from the optical axis ($0 \leq h \leq R_F$),
T(h) represents a thickness of the eyepiece at a height h,
$r_E$ represents a radius of curvature of an exit pupil side surface of the eyepiece in the paraxial region,
$r_F$ represents a radius of curvature of a prism side surface of the eyepiece in the paraxial region,
D represents an axial thickness of the eyepiece,
$R_F$ represents a smallest value among $|r_B|$, $|r_F|$ and an effective radius of the aspherical surface.

It can be added that nearly the same results are produced even if the eyepiece has the aspherical surface on either side thereof.

Hereinafter, the embodiments of the present invention will be described.

FIG. 1 is a transverse sectional view showing the finder optical system of one embodiment according to the present invention.

Light from an object having been passed through the objective lens 1 is refracted at an angle of 90° by a reflecting mirror 2 and focused in the vicinity of a condenser lens 3. In the case of the finder of real image type, the condenser lens 3 is without exception arranged close to a focal plane so that light rays which are to be focused and reach the exit pupil may not be eclipsed. Additionally, in the finder, information such as a frame line which defines an image area and a distance measuring area mark can be seen clearly together with the image of the object by means of disposing a glass plate or the like provided with the frame line and the distance measuring area mark and so on at the position of the focal plane.

The light from the object focused by the objective lens 1 is refracted at an angle of 270° by a pentagonal prism 4a, and thereby is restored to the light rays parallel to the light rays incident on the objective lens 1, and thereafter reaches the exit pupil through an eyepiece 5.

With respect to an erecting optical system in which an inverted image is turned back to an erect image, in the case of adopting a plane mirror for the reflecting mirror 2, a pentagonal roof prism with roof surfaces is applied for the pentagonal prism 4a as same as the case of a single lens reflex camera. Differently therefrom, when the reflecting mirror 2 is a roof mirror or a roof prism having the roof surfaces, pentagonal prism 4a may be without roof surfaces. In addition, as the erecting optical system, it would also be possible to utilize an erecting prism such as a poro prism in place of the reflecting mirror 2 and the pentagonal prism 4a as described above.

Figure 2:
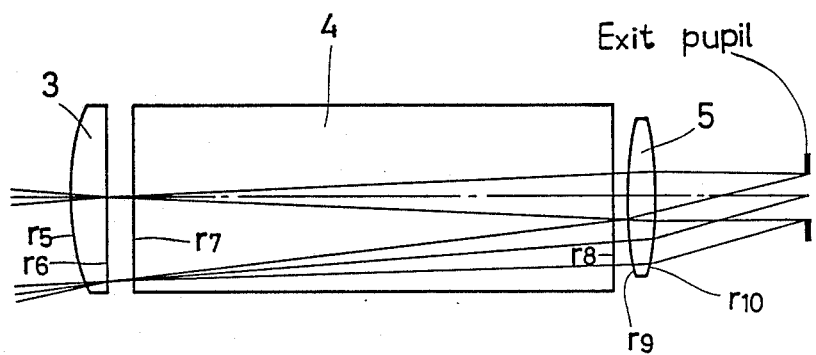
FIG. 2 is a development view showing from a condenser lens to the exit pupil side in the finder optical system together with optical paths of light fluxes.

FIG. 2 is a view showing the optical path in the state that a prism 4 is developed. The prism 4 of either the pentagonal prism or the poro prism is disposed between the condenser lens 3 provided in the vicinity of the focal plane and the eyepiece 5.

The following Tables 1 to 4 disclose, respectively, the first through fourth embodiments of the present invention.

In the Tables, $r_1$, $r_2$ . . . are surfaces of respective lenses and a prism with respective sub numbers indicating the surface from the object side, R represents a radius of curvature of each lens surface or prism surface, axial distance represents an air space between the surfaces or actual thickness of each lens or the prism along the optical axis, Nd equals a refractive index of each lens or the prism relative to D-line, νd equals an Abbe number of the same relative to D-line, fe represents a focal length of an eyepiece, L represents an optical path length, ΔG represents a diopter difference between G-line and D-line, and l represents a distance between an exit pupil side surface of the prism and an object side principal point of the eyepiece. In each Table, the asterisk (*) represents the aspherical surface.

The constitution in Embodiments 2, 3, 4, is the same as that in Embodiment 1 except the prism ($r_7$, $r_8$) and the eyepiece ($r_9$, $r_{10}$).

Further, the shape of the aspherical surface is defined by the following formula:

$$X = \frac{C_0 Y^2}{1 + \sqrt{1 - \epsilon C_0^2 y^2}} + \Sigma C_i Y^{2i}$$

wherein,

X represents the coordinate along the optical axis;

Y represents the coordinate perpendicular to the optical axis at the intersecting point between the aspherical surface and the coordinate X;

$C_0$ represents the curvature of the basic spherical surface of radius of curvature $R_1$ ($C_0 = 1/R_1$);

Ci represents the aspherical surface coefficient; and $\epsilon$ represents the parameter representing the shape of the aspherical surface.

FIGS. 4a to 4c through FIGS. 7a to 7c represent the aberration curves for the first through fourth embodiments, respectively, in which the spherical aberration is obtained at 780 nm of wavelength. The broken line (T) and the solid line (S) show astigmatisms in a tangential image plane and a sagittal image plane, respectively.

TABLE 1

(Embodiment 1)

| | Radius of Curvature R | Axial Distance | Refractive Index Nd | Abbe Number νd |
|---|---|---|---|---|
| $r_1$ | −13.783 | 1.5 | 1.584 | 31.0 |
| $r_2$ | 80.890 | 0.8 | | |
| $r_3$ | 17.939 | 3.5 | 1.4914 | 57.8 |
| $r_4$* | −10.519 | 32.672 | | |
| $r_5$ | 15.393 | 3.0 | 1.4914 | 57.8 |
| $r_6$ | ∞ | 2.2 | | |
| $r_7$ | ∞ | 40.64 | 1.8052 | 25.43 |
| $r_8$ | ∞ | 1.0 | | |
| $r_9$* | 28.872 | 2.3 | 1.4914 | 57.8 |
| $r_{10}$ | −24.394 | | | | fe (concerning Condition ②) = 27.296
L/fe (concerning Condition ③) = 0.82
Axial Diopter Difference ΔG = 0.03
l (conerning Condition ④) = 1.8480

$r_4^*L_2 = 0.165 \times 10^{-3}$, $C_3 = 0.146 \times 10^{-5}$, $C_4 = 0.576 \times 10^{-8}$
$r_9^*\epsilon = -6.2$

TABLE 2

(Embodiment 2)

| | Radius of Curvature R | Axial Distance | Refractive Index Nd | Abbe Number νd |
|---|---|---|---|---|
| $r_7$ | ∞ | 29.0 | 1.805 | 31.0 |
| $r_8$ | ∞ | 0.6 | | |
| $r_9$* | 23.29 | 2.3 | 1.4914 | 57.8 |
| $r_{10}$ | −16.45 | | | | fe (concerning Condition ②) = 20.0
L/fe (concerning Condition ③) = 0.8
Axial Diopter Difference ΔG = 0.07
l (concerning Condition ④) = 1.5214

$r_9^*\epsilon = -25.1$

TABLE 3

(Embodiment 3)

| | Radius of Curvature R | Axial Distance | Refractive Index Nd | Abbe Number νd |
|---|---|---|---|---|
| $r_7$ | ∞ | 60.0 | 1.717 | 47.86 |
| $r_8$ | ∞ | 0.6 | | |
| $r_9$* | 40.25 | 2.3 | 1.4914 | 57.8 |
| $r_{10}$ | −37.70 | | | | fe (concerning Condition ②) = 40.0
L/fe (concerning Condition ③) = 0.87
Axial Diopter Difference ΔG = 0.263
l (concerning Condition ④) = 1.4041

$r_9^*\epsilon = -25.1$

TABLE 4

(Embodiment 4)

| | Radius of Curvature R | Axial Distance | Refractive Index Nd | Abbe Number νd |
|---|---|---|---|---|
| $r_7$ | ∞ | 40.64 | 1.8052 | 25.43 |
| $r_8$ | ∞ | 1.0 | | |
| $r_9$ | 29.153 | 2.3 | 1.4914 | 57.8 |
| $r_{10}$* | −24.209 | | | | fe (concerning Condition ②) = 27.303
L/fe (concerning Conditions ③) = 0.82
Axial Diopter Difference ΔG = 0.03
l (concerning Condition ④) = 1.8550

$r_{10}^*\epsilon = -3$

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A finder optical system comprising from the object side:
   an objective lens having a positive refractive power as a whole;
   a condenser lens arranged in the vicinity of an image plane of said objective lens;
   an eyepiece consisting of a single lens element and having a positive refractive power; and further comprising:
   a prism installed between said condenser lens and said eyepiece to introduce light fluxes having been passed through said condenser lens into said eyepiece;

and wherein the finder optical system fulfills the following conditions:

$$\nu < 50$$

$$15mm < fe < 50mm$$

$$0.7 < L/fe < 1$$

wherein,
   $\nu$ represents an Abbe number of the prism;
   fe represents a focal length of the eyepiece; and
   L represents an optical path length of the prism defined as a ratio of thickness of the prism to the refractive index thereof.

2. A finder optical system as claimed in claim 1, wherein said eyepiece has an aspherical surface on one of the lens surfaces thereof.

3. A finder optical system as claimed in claim 2, wherein said eyepiece fulfills the following conditions:

$$T(h) > r_B\left(1 - \sqrt{1 - \left(\frac{h}{r_B}\right)^2}\right) -$$

$$r_F\left(1 - \sqrt{1 - \left(\frac{h}{r_F}\right)^2}\right) + D$$

wherein,
   h represents a height from an optical axis ($0 \leq h \leq R_F$);

T(h) represents a thickness of the eyepiece at a height h;

$r_B$ represents a radius of curvature of an exit pupil side surface of the eyepiece in the paraxial region;

$r_F$ represents a radius of curvature of a prism side surface of the eyepiece in the paraxial region;

D represents an axial thickness of the eyepiece; and $R_F$ represents a minimum value among $|r_B|$, $|r_F|$ and an effective radius of the aspherical surface.

4. A finder optical system as claimed in claim 3, wherein said eyepiece has an aspherical surface on the prism side.

5. A finder optical system as claimed in claim 3, wherein said eyepiece has a aspherical surface on the exit pupil side.

6. A finder optical system as claimed in claim 3, wherein said eyepiece is a bi-convex lens.

7. A finder optical system comprising from the object side:
- an objective lens having a positive refractive power as a whole;
- a condenser lens arranged in the vicinity of an image plane of said objective lens;
- an eyepiece consisting of a single lens element and having a positive refractive power; and further comprising:
- a prism installed between said condenser lens and said eyepiece to introduce light fluxes having been passed through said condenser lens into said eyepiece;

and wherein the finder optical system fulfills the following conditions:

$$\nu < 50$$

$$15\text{mm} < fe < 50\text{mm}$$

$$1 \leq 2.5\text{mm}$$

wherein, $\nu$ represents an Abbe number of the prism;

fe represents a focal length of the eyepiece; and l represents a distance between an exit pupil side surface of the prism and an object side principal point of the eyepiece.

8. A finder optical system as claimed in claim 7, wherein the finder optical system further fulfills the following condition:

$$0.7 < L/fe < 1$$

wherein, L represents a optical path length of the prism defined as a ratio of thickness of the prism to the refractive index thereof.

9. A finder optical system as claimed in claim 8, wherein the finder optical system still further fulfills the following condition:

$$1.7 < n_P$$

wherein, $n_P$ represents a refractive index of the prism relative to D-line.

10. A finder optical system as claimed in claim 7, wherein said eyepiece is a bi-convex lens.

11. A finder optical system as claimed in claim 10, wherein said eyepiece has an aspherical surface on one of the lens surfaces thereof.

* * * * *